United States Patent [19]
Roth et al.

[11] 3,762,806
[45] Oct. 2, 1973

[54] MOTION PICTURE CAMERA

[75] Inventors: Johann Roth, Schwabhausen;
Werner Grimm, Emmering, both of Germany

[73] Assignee: Niezoldi & Kramer GmbH, Munich-Allach, Germany

[22] Filed: Oct. 1, 1971

[21] Appl. No.: 188,708

[30]     Foreign Application Priority Data
    Oct. 1, 1970   Germany.................. P 20 48 317.4

[52] U.S. Cl.................. 352/121, 352/137, 352/169
[51] Int. Cl. ............................................ G03b 17/46
[58] Field of Search.................... 352/121, 137, 169, 352/174, 176, 177, 178, 179

[56]         References Cited
          UNITED STATES PATENTS
3,603,678    9/1971   Anderl............................... 352/169

*Primary Examiner*—Monroe H. Hayes
*Attorney*—Michael S. Striker

[57]           ABSTRACT

A motion picture camera which can be set to make a single exposure in response to each actuation of the camera release, a series of time lapse exposures at desired intervals, or a series of exposures at predetermined intervals. The shutter of the camera is rotatable by a drive which is controlled by a blocking lever. The latter can be moved from a drive-blocking position in response to energization of an electromagnet which is energized on actuation of the camera release and remains energized (when the camera is set to make single exposures or time lapse exposures) for intervals which are shorter than the interval required to complete a single revolution of the shutter. The deenergization of electromagnet is regulated by control circuit which includes an electronic timer employing a capacitor and three series-connected galvanically coupled transistors. The polarity of voltage across the capacitor is reversed in response to actuation of the camera release.

21 Claims, 2 Drawing Figures

MOTION PICTURE CAMERA

CROSS-REFERENCE TO RELATED APPLICATION

The motion picture camera of the present invention constitutes an improvement over and a further development of cameras which are disclosed in the copending application Ser. No. 790,663 filed Jan. 13, 1969 by Peter Anderl et al. now U.S. Pat. No. 3603678 and owned by the assignee of the present case.

BACKGROUND OF THE INVENTION

The present invention relates to cinematographic apparatus in general, and more particularly to improvements in motion picture cameras. Still more particularly, the invention relates to improvements in motion picture cameras of the type disclosed in the copending application Ser. No. 790,663 of Anderl et al. now U.S. Pat. No. 3603678.

The motion picture camera of Anderl et al comprises a selector which can be adjusted to set the camera for three different modes of operation, namely, for the making of a single exposure in response to each actuation of the release, for the making of a series of exposures at predetermined intervals in response to a single actuation of the release whereby the making of exposures is terminated when the operator terminates the actuation of the release, and for the making of a series of exposures at desired intervals time lapse whereby the making of exposures is terminated in response to termination of actuation of the release. The camera of Anderl et al embodies a blocking member tending to assume a blocking position in which it prevents the operation of a drive for the shutter and film transporting mechanism. The blocking member is movable from such blocking position by an electromagnet which is energizable exclusively in response to actuation of the release. The circuit which controls the energization of electromagnet comprises a pulse shaper which is effective when the camera is set to make a single exposure in response to each actuation of the release, and a pulse generator which is operative when the camera is set to make several exposures in response to a single actuation of the release.

SUMMARY OF THE INVENTION

An object of the invention is to simplify the construction of control means for the electromagnet in the aforedescribed motion picture camera.

Another object of the invention is to provide a simple, compact, inexpensive and energy-saving control circuit which regulates the energization of the electromagnet irrespsective of setting of the selector and which insures that the electromagnet is deenergized in time when the camera is set to make single exposures or several time lapse exposures at variable intervals.

A further object of the invention is to provide a control circuit which enables the user of the motion picture camera to make one or more exposures with exposure times which are a function of scene brightness of one or more exposures with aperture sizes which are a function of scene brightness.

An additional object of the invention is to provide an improved motion picture camera wherein the consumption of electrical energy is lower than in presently known motion picture cameras which exhibit the same versatility or which are less versatile than the improved camera.

The invention is embodied in a motion picture camera which comprises a preferably adjustable rotary shutter, a drive which is operable to rotate the shutter whereby the rotation of shutter through a predetermined angle (e.g., 360°) which is normally required for the making of an exposure takes up a first predetermined interval of time, blocking means which is movable between blocking and unblocking positions to thereby respectively prevent and initiate the operation of the drive, electromagnet means which is energizable to effect the movement of blocking means from the blocking position, and novel control means which includes selector means a portion of which is movable between a first position in which the camera is set to make a single exposure in response to actuation of the release means, a second position in which the camera is set to make time lapse exposures at selected or desired intervals, and a third position in which the camera is set to make exposures at predetermined intervals. The control means further comprises electronic timer means which serves to energize the electromagnet means for second predetermined intervals each of which is shorter than the first predetermined interval when the aforementioned portion of the selector means dwells in the first or second position. The release means is actuatable by hand or by remote control to initiate the energization of electromagnet means.

The timer means comprises capacitor means which is connected in the circuit of the control means in such a way that the polarity of voltage thereacross is reversed in response to actuation of the release means. The timer means further comprises series-connected galvanically coupled first, second and third transistors. The first and third transistors conduct in response to actuation of the release means whereby the third transistor energizes the electromagnet means.

The control means further comprises charging resistor means for the capacitor means. The capacitor means renders the second transistor conductive by way of the charging capacitor means when the aforementioned portion of the selector means dwells in the first or second position whereby the second transistor causes the third transistor to deenergize the electromagnet means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
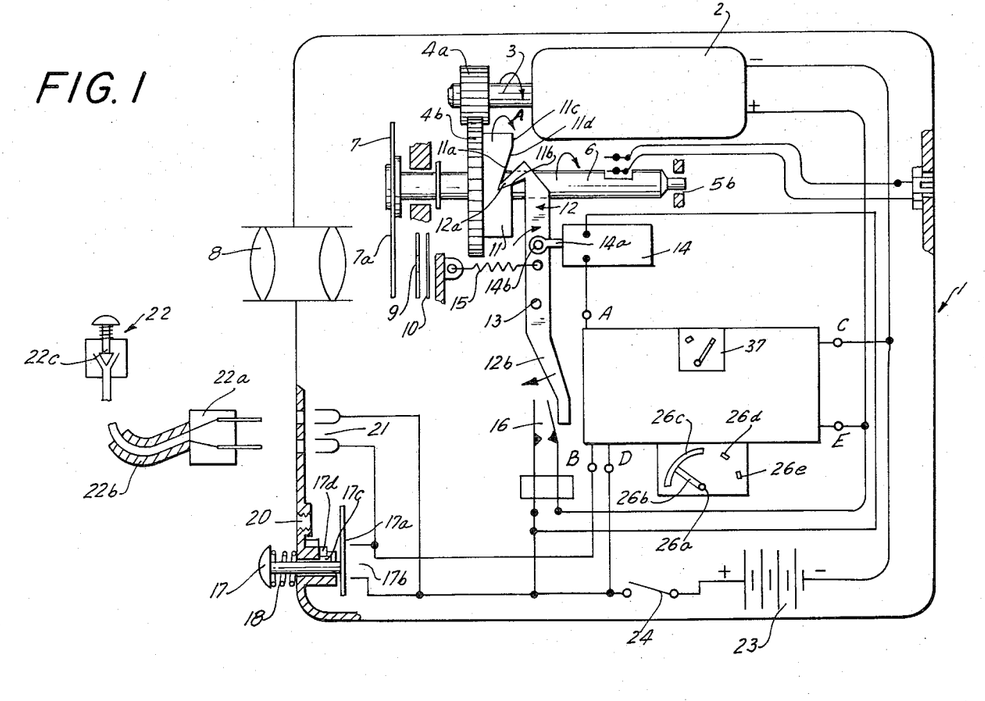
FIG. 1 is a schematic longitudinal vertical sectional view of a motion picture camera which embodies the invention.

Referring first to FIG. 1, there is shown a motion picture camera which comprises a housing or body 1 accommodating an electric motor 2 whose output shaft 3 drives a main drive shaft 6 by way of a transmission including reducing gears 4a and 4b. The main drive shaft 6 rotates in bearings 5a and 5b which are mounted in the housing 1. The front end portion of the shaft 6 carries and drives a rotary shutter 7 having an angularly adjustable blade 7a which normally extends between the film path and the picture taking objective 8 when the motor 2 is at a standstill to thus prevent exposure of the foremost unexposed film frame. The reference character 9 denotes a light-admitting aperture provided in a gate which is located in front of the film 10. The aperture 9 is normally overlapped by the shutter blade 7a when the motor 2 is idle. The blade 7a also normally overlaps the light-admitting aperture 9 when the film 10 is being transported lengthwise by the length of a frame between successive exposures. The main drive shaft 6 further transmits motion to a conventional film transporting or feeding mechanism, for example, a mechanism which includes a customary claw pull-down (not shown) receiving motion from one or more cams (not shown) on the shaft 6 and serving to transport the film 10 stepwise, always by the length of a frame, during a certain stage of each revolution of the shaft 6.

The main drive shaft 6 further supports and rotates a locating wheel 11 which is shown as being rigid with the gear 4b of the speed reducer and cooperates with a blocking member 12. The latter is shown in the form of a two-armed lever which is fulcrumed in the housing 1, as at 13, and is articulately connected (as at 14b) with the reciprocable armature 14a of an electromagnet 14 which is mounted in the housing 1. The armature 14a is coupled to the upper arm of the lever 12, and this upper arm is further connected with a helical spring 15 which is anchored in the housing 1 and tends to turn the lever 12 in a counterclockwise direction, as viewed in FIG. 1. The upper end portion of the upper arm of the lever 12 is provided with a pallet or tooth 12a which can enter a cutout or notch 11a in the right-hand end face 11c of the wheel 11. The pallet 12a extends into the notch 11a when the motor 2 is idle. The notch 11a is flanked by a first inclined flank 11d which merges into the end face 11c of the wheel 11, and by a second inclined flank 11b which makes an acute angle with the flank 11d. When the pallet 12a engages the flank 11b, the locating wheel 11 is held in a predetermined angular position in which the blade 7a of the shutter 7 normally overlaps the light-admitting aperture 9 between the objective 8 and the motion picture film 10.

The lower arm 12b of the lever 12 serves as an actuating means or trip for a normally open electric starter switch 16 which is in open position when the pallet 12a engages the flank 11b in the notch 11a of the locating wheel 11. The starter switch 16 is connected in circuit with the motor 2. When the lever 12 pivots under the action of the spring 15 so that the pallet 12a enters the notch 11a of the locating wheel 11, the switch 16 effects a fully automatic stoppage of the motor 2 because it is then disengaged from the arm 12b and is free to assume its open position to thereby disconnect the motor 2 from an energy source 23, e.g., one or more batteries or the like.

The front wall of the camera housing 1 supports a release knob or trigger 17 which can be depressed against the opposition of a helical spring 18 whereby the movable contact 17a at the inner end of the knob 17 engages the fixed contacts of a release switch 17b which is mounted in the housing 1 and is connected in circuit with the electromagnet 14 by way of an electronic control circuit 25. The release switch 17b can also be closed by a customary Bowden wire or an analogous remote control release device (not shown) one end portion of which can be threaded into a tapped bore 20 provided in the front wall of the housing 1 in front of the movable contact 17a. The remote control release device may comprise a flexible core or shaft (not shown) which is movable axially in a tubular sheath to thereby shift the contact 17a in a direction to the right, as viewed in FIG. 1 and to thus close the release switch 17b in a manner well known from the art of photographic apparatus.

The front wall of the housing 1 further supports a socket 21 which can receive the prongs of a plug 22a connected with a remotely controlled auxiliary trigger or release 22 by a flexible electric cable 22b. The trigger 22 contains a normally open switch 22c which can be closed by hand whereby the circuit of the electromagnet 14 can be completed irrespective of the condition of the release switch 17b. The two terminals of the socket 21 are connected with the fixed contacts of the switch 17b (i.e., the socket 21 is connected in parallel with the switch 17b) and the closing of the switch 22c in the auxiliary trigger establishes an electrical connection between the stationary contacts of the switch 17b, the same as in response to a rightward movement of the contact 17a on depression of the release knob 17. The illustrated auxiliary trigger 22 can be used as a superior substitute for the conventional remote control wire release which is connectable with the housing 1 by being threaded into the tapped opening 20. The auxiliary trigger 22 can be readily designed for use with any commercially available release device which can close the switch 22c with a desired delay. Moreover, the switch 22c can be closed by another apparatus or instrument which is to be operated simultaneously with the motion picture camera of the present invention or whose operation should precede or follow the operation of the camera.

The release switch 17b is in series with a master switch 24 which is in series with the energy source 23. The connections between the poles of the energy source 23 and the control circuit 25 are shown at B and C (the negative pole of the energy source is connected directly with C whereas the connection between the energy source 23 and B includes the switches 24 and 17b. The positive pole of the energy source 23 is further connected with the control circuit 25 at D in response to closing of the master switch 24, i.e., irrespective of the condition of the release switch 17b. The electromagnet 14 is connected with the control circuit 25, as at A, and one contact of the starter switch 16 for the motor 2 is connected with the terminal E of the control circuit 25.

The knob 17 can be maintained in depressed position by a releasable locking device which includes a stationary locking member 17d in the camera body 1 and a movable locking member 17c on the stem of the knob 17. If the knob 17 is depressed against the opposition of the spring 18 and is thereupon rotated about its axis, the member 17c bears against the right-hand face of the member 17d which latter prevents an opening of the release switch 17b. The member 17d has a slot which receives the member 17c when the knob 17 is returned to the angular position shown in FIG. 1.

Figure 2:
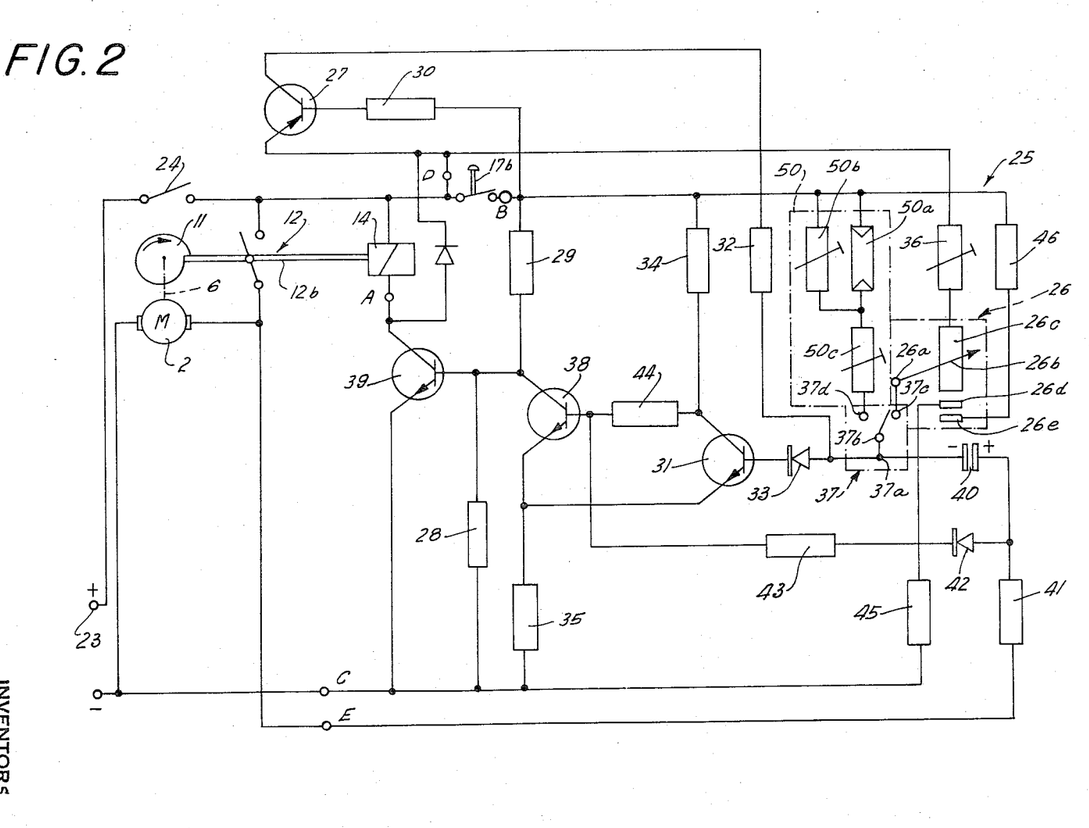
FIG. 2 is a diagram of the electric circuit of the camera shown in FIG. 1, the circuit being shown in that condition in which the camera is set to make a series of "short" exposures at variable intervals.

The details of the electronic control circuit 25 are illustrated in FIG. 2. For the sake of simplicity, FIG. 2 shows one contact of the starter switch 16 as being mounted on the lower arm 12b of the blocking lever 12 and this lever is shown as being reciprocable by the armature of the electromagnet 14 (the lever 12 can be said to constitute or to form part of the armature of this electromagnet).

The control circuit 25 is designed to set the motion picture camera for three different types of operation, namely, to make single exposures, to make a series of exposures at a preselected frequency, i.e., at predetermined intervals, and to make a succession of exposures at a desired (variable) frequency. To this end, the circuit 25 comprises a selector in the form of a composite resistor 26 having a contact or slider 26b which is pivotable at 26a to assume a plurality of angular positions in each of which the camera is set for a different mode of operation. The contact 26b can engage selected portions of an arcuate stationary contact 26c to form therewith a potentiometer or variable resistor which determines the length of intervals between successive exposures when the camera is set to make exposures at a variable (desired) frequency. When the camera is to make single exposures, the contact 26b is moved into engagement with a second fixed contact 26d to form therewith a fixed resistor and the contact 26b engages and forms a fixed resistor with a third fixed contact 26e when the camera is set to make exposures at a predetermined frequency.

If the user wishes to make one or more exposures, the master switch 24 is closed in the first step. The release switch 17b is still open (see FIG. 2) but the closing of master switch 24 results in the application of a negative potential to the base of a pnp-transistor 27 from the negative pole of the energy source 23 and by way of fixed resistors 28, 29, 30. The emitter of the transistor 27 is directly connected with the positive pole of the energy source 23 in response to closing of the master switch 24. Closing of the master switch 24 results in the application of a positive potential to the base of an npn-transistor 31 by way of the emitter-collector circuit of the transistor 27, a fixed resistor 32 and a diode 33. Thus, the potential at the base of the transistor 31 is a positive potential before the release switch 17b is closed. This insures that the control circuit 25 assumes a predetermined starting condition which in turn insures an extremely rapid change in the condition of the transistor 31 for any one of the three modes of operation. Such rapid change in the condition of the transistor 31 brings about an equally rapid change in the condition of energization of the electromagnet 14 which pivots the blocking lever 12 so that the latter permits the making of at least one exposure by moving its pallet 12a out of the notch 11a of the locating wheel 11 (this is the unblocking or inoperative position of the lever 12).

If the user of the camera decides to make a series of time lapse exposures at desired (variable) intervals, the contact 26b of the selector 26 is moved into engagement with a selected portion of the fixed contact 26c (see FIG. 2). The release switch 17b is thereupon closed by depressing the knob 17 so that the switch 17b connects the collector of the npn-transistor 31 with the positive pole of the energy source 23 by way of a fixed resistor 34. The negative pole of the energy source 23 is connected with the emitter of the transistor 31 by way of a fixed resistor 35. Since a positive potential is already applied to the base of the transistor 31 (in response to closing of the master switch 24), the condition of the transistor 31 changes in immediate response to closing of the release switch 17b. However, the closing of release switch 17b results in the application of positive potential to the base of the pnp-transistor 27 by way of the fixed resistor 30 which is connected between the release switch 17b and the base of the transistor 27. Thus, the transistor 27 blocks and the application of positive potential to the base of transistor 31 by way of the emitter-collector circuit of the transistor 27 is terminated. However, the base of the transistor 31 continues to receive positive potential by way of the contacts 26b, 26c of the selector 26, a variable resistor 36 and a switchover device 37. Therefore, the transistor 31 remains conductive after the closing of release switch 17b. In such condition, the transistor 31 blocks a further transistor 38 because its collector-emitter potential is lower than that input (base-emitter) potential which is necessary to render the transistor 38 conductive. The closing of release switch 17b further causes a change in the condition of a transistor 39 whose base is connected with the positive pole of the energy source 23 by way of the resistor 29 in immediate response to closing of the release switch 17b (with the master switch 24 closed).

The transistor 39 is connected in series with the electromagnet 14 so that the winding of the electromagnet 14 receives the collector-emitter current of the transistor 39 and the armature 14a pivots the blocking lever 12 about the pivot pin 13 to thus withdraw the pallet 12a from the notch 11a of the locating wheel 11. At the same time, the arm 12b of the blocking lever 12 closes the starter switch 16 for the motor 2. As the starter switch 16 closes, it causes the charging of a capacitor 40 in a manner as shown in FIG. 2. The right-hand plate or electrode of the capacitor 40 is then connected with the positive pole of the energy source 23 by way of a fixed resistor 41 and switches 16, 24, and the lefthand electrode or plate of the capacitor 40 is connected with the negative pole of the energy source 23 by way of the fixed resistor 35, the emitter-base circuit of the transistor 31 and the diode 33.

The rise of potential at the right-hand plate of the capacitor 40 is communicated to the base of the transistor 38 by way of a diode 42 and a fixed resistor 43 whereby the condition of the transistor 38 changes with the result that the transistor 39 blocks because the collector-emitter voltage of the transistor 38 plus the voltage drop across the resistor 35 is smaller than necessary to render the transistor 39 conductive, i.e., smaller than the input (base-emitter) voltage at the transistor 39. The resistor 44 prevents the flow of base current by way of the transistor 31.

As the transistor 39 blocks, the winding of the electromagnet 14 is deenergized. Such deenergization takes place prior to completion of a full revolution by the locating wheel 11 and the timing of deenergization is determined by the interval which is required for charging of the capacitor 40 by way of the resistor 41. Thus, the spring 15 is free to urge the pallet 12a against the end face 11c of the locating wheel 11 in good time before the notch 11a completes a full revolution. Consequently, the pallet 12a enters the notch 11a and arrests the locating wheel 11, the drive shaft 6 and the shutter 7 in an angular position in which the shutter blade 7a overlies the light-admitting aperture 9. This completes one full exposure cycle. In other words, the interval of time which is required for such angular displacement of the shutter 7 that the camera completes an exposure is longer than the interval during which the electromagnet 14 is energized in response to closing of the release switch 17b.

Premature opening of the circuit of the motor 2 is prevented by the end face 11c of the locating wheel 11 because the pallet 12a tracks the end face 11c prior to entering the oncoming notch 11a. Thus, the starter switch 16 remains closed as long as the pallet 12a abuts against the end face 11a even though the electromagnet 14 is preferably deenergized prior to reentry of the pallet 12a into the notch 11a, i.e., even if the condition of the transistor 39 changes prematurely. The cycle is completed when the drive shaft 6 completes a full revolution.

When the pallet 12a is caused to enter the notch 11a under the action of the spring 15, the circuit of the motor 2 is opened by the starter switch 16 which is released by the arm 12b of the blocking lever 12. Opening of the starter switch 16 results in connection of the right-hand plate of the capacitor 40 with the negative pole of the energy source 23 by way of the resistor 41 and the winding of the motor 2. Thus, the base of the transistor 31 receives negative potential because the combined ohmic resistance of the resistors 36 and 26c between the positive pole of the energy source 23 and the base of the transistor 31 is substantially higher than the combined resistance of the resistor 41 and the winding of the motor 2. In its momentary condition of polarity, the diode 33 serves to prevent the application of excessive negative potential to the base of the transistor 31.

The transistor 31 blocks but the transistor 38 remains conductive because its base receives positive potential by way of the resistors 34 and 44. The transistor 39 continues to block because its base does not receive a sufficient positive potential after the transistor 38 begins to conduct.

The condition of the capacitor 40 changes with a predetermined and variable delay in response to the application of a positive potential to its left-hand plate by way of the variable resistors 36 and 26b, 26c. When the left-hand plate of the capacitor 40 becomes positively charged to such an extent that its charge exceeds the sum of the voltages at the diode 33 and the base-emitter circuit of the transistor 31 (inclusive of the voltage drop across the resistor 35), the transistor 31 becomes conductive and the transistor 38 begins to block due to a drop in its base-emitter potential to below the threshold value. The voltage which is needed to render the transistor 31 conductive drops proportionally with the drop in base-emitter potential at the transistor 38 which is desirable because the control circuit 25 is capable of reacting with a minimal delay. As the transistor 38 blocks, the voltage at the base of the transistor 39 rises beyond the threshold value so that the transistor 39 becomes conductive and energizes the electromagnet 14 which moves the blocking lever 12 to the unblocking position and allows the camera to make a second exposure. The film 10 is advanced by the length of a frame in response to each revolution of the main drive shaft 6. When the blocking lever 12 closes the starter switch 16, the capacitor 40 is charted again with a polarity as shown in FIG. 2 and the base of the transistor 38 receives a positive potential so that the latter becomes conductive before the locating wheel 11 completes a full revolution. This causes the transistor 39 to block and to deenergize the electromagnet 14 so that the pallet 12a of the blocking lever 12 is free to reenter the notch 11a under the action of the spring 15 and to cause the starter switch 16 to open when the locating wheel 11 completes a full revolution. Opening of the starter switch 16 results in charging of the capacitor 40 but in a manner different from that shown in FIG. 2 whereby the interval required for charging of the capacitor 40 by way of the resistors 26c and 36 determines the length of the interval between the second and third exposures. The operator can change such delay by changing the angular position of the movable contact 26b with reference to the contact 26c and/or by adjusting the resistor 36.

For example, the resistance of the variable resistor 26b, 26c may be selected in such a way that, in one end position of the contact 26b with reference to the contact 26c, the length of intervals between successive exposures corresponds to a frequency of six exposures per second. The contact 26b then engages the contact 26c in such angular position that the resistor including these contacts offers a minimum resistance to the flow of current. The variable resistor 36 is connected in series with the contact 26c and is adjustable to allow for accurate selection of intervals between successive exposures when the camera is set to make exposures at desired or variable intervals. If the contact 26b is moved to another end position with reference to the contact 26c (in which the resistor 26b, 26c offers a maximum resistance to the flow of current), the camera can be set to make exposures at one-minute intervals. Thus, the camera of the present invention can be set to make exposures at all such intervals which are necessary or desirable for amateur photography as well as by professional photographers.

The capacitor 40 forms with the transistors 31, 38 and 39 an electronic timer circuit which determines the length of intervals between successive exposures in dependency on the adjustment of the resistor 36 and the position of the contact 26b with reference to the contact 26c. The parts 26b, 26c form a variable resistor which is in series with the variable resistor 36 when the selector 26 is set in a manner as shown in FIG. 2 so as to prepare the camera for the making of exposures at desired intervals. The change in charging of the capacitor 40 begins with opening of the starter switch 16 and is completed with a delay which is a function of the combined resistance of resistors 36 and 26b, 26c.

If the user wishes to make a single exposure, the contact 26b of the selector 26 is moved into engagement with the contact 26d. By thereupon depressing the release knob 17, the user closes the release switch 17b whereby the electromagnet 14 is energized and pivots the lever 12 to the unblocking or inoperative position. The exposure is made in practically immediate response to depression of the release knob 17 due to an immediate change in the condition of the transistor 31. The master switch 24 is assumed to have been closed prior to closing of the release switch 17b so that the transistor 27 allows the application of positive potential to the base of the transistor 31 as soon as the release switch 17b closes. This results in positive charging of the left-hand plate of the capacitor 40 (as viewed in FIG. 2). The charge of the capacitor 40 exceeds the threshold value of the base potential at the transistor 31 to such an extent that the transistor 31 begins to conduct in spite of blocking of the transistor 27 (as a result of closing of the release switch 17b). The interval during which the transistor 31 conducts is sufficiently long to insure that the pallet 12a is withdrawn from the notch 11a so that the motor 2 (whose circuit is completed by the starter switch 16) can turn the locating wheel 11 whereby the pallet 12a comes into abutment with the end face 11c and cannot reenter the notch 11a before the wheel 11 completes a full revolution.

When the starter switch 16 is closed by the blocking lever 12, the capacitor 40 is being charged in a manner as shown in FIG. 2 whereby the base of the transistor 38 receives positive potential by way of the diode 42 and resistor 43. The transistor 38 begins to conduct before the locating wheel 11 completes a full revolution so that the transistor 39 begins to block and deenergizes the electromagnet 14 which allows the spring 15 to bias the pallet 12a against the end face 11c of the locating wheel 11. Consequently, the pallet 12a reenters the notch 11a and arrests the drive shaft 6 upon completion of a single exposure and in such angular position of the shaft 6 and locating wheel 11 that the shutter blade 7a overlies the light-admitting aperture 9. The film 10 is automatically advanced by the length of a frame while the shaft 6 completes a full revolution in response to closing of the release switch 17b while the contact 26b of the selector 26 engages the contact 26d.

The camera cannot make more than a single exposure when the contact 26b engages the contact 26d because the variable resistors 26b, 26c, 36 are then disconnected from the base of the transistor 31, i.e., the release knob 17 must be allowed to open the release switch 17b and must be depressed again in order to cause the camera to make a second single exposure.

When the contact 26b of the selector 26 engages the contact 26d (i.e., when the camera is set to make a single exposure in response to each depression of the release knob 17), the contact 26b is connected with the negative pole of the energy source 23 by way of the contact 26d and a resistor 45. One terminal of the resistor 45 is permanently connected with the negative pole of the energy source 23 and the other terminal of this resistor is then connected with the lefthand plate of the capacitor 40 by way of the contacts 26d, 26b and switchover device 37. More particularly, the other terminal of the resistor 45 is then connected with a tap 37a between the diode 33 and the left-hand plate of the capacitor 40. The base of the transistor 31 receives negative potential by way of the resistor 45. The purpose of the resistor 45 is to prevent the application of positive potential to the base of the transistor 31 in response to prolonged depression of the release knob 17 when the contact 26b of the selector 26 engages the contact 26d. The resistor 45 then shunts the external voltage. This prevents an undesirable change in the condition of the transistor 31 and the resulting energization of electromagnet 14 for the purpose of making a second exposure while the contact 26b engages the contact 26d.

To make exposures at predetermined intervals, the user of the camera proceeds as follows:

The contact 26b of the selector 26 is moved into engagement with the contact 26e and the master switch 24 is closed. When the release switch 17b is closed in response to depression of the release knob 17, the base of the transistor 31 receives positive potential by way of a resistor 46. The condition of the transistor 31 changes with attendant change in the condition of the transistor 39 which energizes the electromagnet 14. The armature 14a of the electromagnet 14 pivots the blocking lever 12 against the opposition of the spring 15 so that the pallet 12a is withdrawn from the notch 11a of the locating wheel 11 and the arm 12b of the lever 12 closes the starter switch 16.

The resistance of the resistor 46 is substantially lower than that of the resistor 41. As mentioned above, the resistor 46 allows for the application of positive potential to the base of the transistor 31 in response to closing of the release switch 17b when the contact 26b engages the contact 26e. Therefore, the charge at the left-hand plate of the capacitor 40 (namely, that plate which is connected with the diode 33) is always more positive than the charge at the right-hand plate which is connected with the resistor 41. Due to such voltage drop at the capacitor side which faces the resistor 41, the closing of starter switch 16 cannot bring about the application of sufficient positive potential to the base of the transistor 38 (by way of resistor 41, diode 42 and resistor 43) so that the condition of the transistor 38 remains unchanged and the latter cannot block the transistor 39. Consequently, the electromagnet 14 remains energized as long as the release knob 17 maintains the release switch 17b in closed position whereby the pallet 12a cannot enter the notch 11a and the motor 2 is free to drive the shaft 6 at a predetermined speed so that the camera makes a series of exposures at preselected intervals. When the application of finger pressure against the release knob 17 is terminated, the spring 18 is free to open the release switch 17b whereby the base of the transistor 39 ceases to receive current and the transistor 39 blocks to open the circuit of the electromagnet 14. The armature 14a allows the spring 15 to bias the pallet 12a against the end face 11c of the locating wheel 11 so that the pallet 12a enters the oncoming notch 11a and arrests the main drive shaft 6 in an angular position in which the shutter blade 7a overlies the light-admitting aperture 9. The circuit of the motor 2 is opened by the starter switch 16 as soon as the pallet 12a enters the notch 11a.

The aforementioned switchover device 37 of the control circuit 25 can connect certain components of the control circuit 25 with time-delay unit 50 which enables the operator to select a relatively long exposure time for exposure of a given film frame to scene light. The manner in which the delay unit 50 can maintain the shutter blade 7a in an open position for a desired interval of time is fully disclosed in the commonly owned copending application Ser. No. 790,663 now U.S. Pat. No. 3603678 to which reference may be had if necessary. The delay unit 50 maintains the shutter blade 7a in open position upon completion of a film transporting phase (upon completion of a revolution of the shaft 6) and until the start of the next film transporting phase. The purpose of lengthy illumination of film frames is to allow for proper exposure of all details of stationary objects in artificial light. For example, the user might decide to make "long" exposures of buildings, plazas, squares, streets or the like with artificial illumination of such subjects so as to insure full exposure of minute details of the photographed scene. Such photography with "long" exposures is in contrast with normal motion picture photography with "short" exposures which are necessary to insure satisfactory exposure of moving objects while the selector 26 sets the camera for the making of single exposures, a series of exposures at predetermined intervals or a series of time lapse exposures at variable intervals. As a rule, the "long" exposures which can be made by connecting the delay unit 50 in circuit with certain components of the control circuit 25 would be unsatisfactory for the photographing of moving objects or bodies.

When the movable contact 37b of the switchover device 37 is moved from engagement with a contact 37c (as shown in FIG. 2) into engagement with a contact 37d, the closing of the master switch 24 results in application of a positive potential to the base of the transistor 31 by way of the transistor 27 in the same way as described above for operation of the camera with "short" exposure times. When the user thereupon depresses the release knob 17 to close the release switch 17b, the transistor 27 blocks to interrupt the flow of current to the base of the transistor 31. However, the base of the transistor 31 then receives positive potential by way of the resistors 50a, 50b and 50c which form part of the delay unit 50. The resistor 50a is preferably a photosensitive receiver which is exposed to scene light so that its resistance varies as a function of scene brightness. The light which impinges upon the receiver 50a is preferably obtained by deflecting a portion of incoming scene light with a suitable mirror or the like, not shown. The resistor 50b is connected in parallel with the receiver 50a and serves to correct the characteristic of the receiver 50a so as to insure an exposure time which is a satisfactory function of the momentary intensity of incoming scene light.

The resistor 50c is a variable resistor and is connected in series with the receiver 50a and resistor 50b of the delay unit 50. The purpose of the variable resistor 50c is to allow for the selection of the shortest "long" exposure time (e.g., 1/10 second).

In order to make satisfactory "long" exposures, the exposure control which is operative during normal operation of the camera must be deactiviated and the diaphragm (not shown) must be adjusted to furnish a predetermined aperture size or f/stop. It was found that an f/stop of "4" is particularly suited for the making of "long" exposures with a camera having a picture taking objective which is capable of insuring the making of proper exposures in weak light. The depth of field with an f/stop of "4" is satisfactory to insure full exposure of reliefs and other details at a short distance from the subject.

It is further within the scope of the present invention to effect an automatic change in the position of the contact 37b (so that the contact 37b is disengaged from the contact 37c and engages the contact 37d of the switchover device 37) in response to adjustment of the diaphragm to furnish a preferably large aperture size and in response to such adjustment in the angular position of the shutter blade 7a with reference to the drive shaft 6 that the blade 7a admits scene light when the shutter 7 is at a standstill. The arrangement may be such that the camera comprises a lever or an analogous actuating device (not shown) which can be manipulated to adjust the shutter blade 7a with reference to the shaft 6 so that the blade 7a allows scene light to reach the aperture 9 while the shutter 7 is at a standstill whereby the lever automatically moves the contact 37b into engagement with the contact 37d. The delay unit 50 is then integrated into the control circuit 25. The just discussed lever can further serve to open at least one first switch (not shown) which is installed in the exposure control of the camera to thereby terminate automatic adjustment of the aperture size as a function of scene brightness during the making of "short" exposures and to simultaneously close a second switch (not shown) which causes the diaphragm to furnish a preferably large aperture size for the making of "long" exposures. For example, the first switch of the exposure control can disconnect the diaphragm adjusting mechanism from a photosensitive receiver of the exposure control and the second switch can connect the diaphragm adjusting mechanism with a fixed resistor which insures that the aperture size remains unchanged (and that this aperture size corresponds to a desired f/stop) during the making of "long" exposures.

It is further within the purview of the invention to employ the photosensitive receiver 50a as a part of the delay unit 50 when the switchover device 37 is adjusted to move the contact 37b into engagement with the contact 37d or as a part of the exposure control for the making of "short" exposures by using the receiver 50a to control the aperture size while the contact 37b engages the contact 37c (as shown in FIG. 2). As mentioned above, the receiver 50a is preferably exposed to a portion of incoming scene light. Such mounting of the receiver 50a results in desirable savings in parts and space, i.e., a single photosensitive receiver suffices to allow for appropriate control of exposures as a function of scene brightness when the camera is set to make exposures with "short" or "long" exposure times. Moreover when the receiver 50a receives scene light which enters the camera body 1 by way of the objective 8, the utilization of this receiver as a part of the delay unit 50 as well as a part of the exposure control for the making of "short" exposures renders it possible to eliminate the mechanism which is necessary when the camera employs two photosensitive receivers. Such mechanism then insures that one of the photosensitive receivers receives scene light during the making of "long" exposures and that the other receiver receives scene light during the making of "short" exposures.

When the release knob 17 is depressed to close the release switch 17b while the contact 37b of the switchover device 37 engages the contact 37d, the base of the transistor 31 receives current by way of the resistors which form part of the delay unit 50. The transistor 31 becomes conductive (in the same way as described above in connection with the making of "short" exposures) to cause the transistor 38 to block and the transistor 39 to conduct. Thus, the electromagnet 14 is energized and its armature 14a retracts the pallet 12a of the blocking lever 12 from the notch 11a of the locating wheel 11. The blocking lever 12 closes the starter switch 16 which automatically completes the circuit of the motor 2. The latter drives the locating wheel 11 by way of the gears 4a, 4b and shaft 6 so that the wheel 11 con complete a full revolution before the pallet 12a reenters the notch 11a, the same as in connection with the making of single "short" exposures or of a series of "short" exposures at variable intervals. The electromagnet 14 allows the spring 15 to pivot the blocking lever 12 in a direction to introduce the pallet 12a into the notch 11a in response to the application of a positive potential to the base of the transistor 38, beginning with the closing of the starter switch 16. The positive pole of the energy source 23 is then connected with the base of the transistor 38 by way of the resistor 41, diode 42 and resistor 43. This causes the transistor 38 to conduct and the transistor 39 to block, the same as in connection with the making of exposures at desired intervals (when the contact 26b engages the contact 26c). The resistor 41 determines the length of the interval which is required for the charging of capacitor 40 before the locating wheel 11 completes a full revolution. The electromagnet 14 becomes deenergized in response to blocking of the transistor 39 so that the spring 15 pivots the blocking lever 12 and the pallet 12a enters the notch 11a to arrest the locating wheel 11 in the predetermined angular position. As mentioned above, the making of "long" exposures is preceded by such adjustment of the shutter blade 7a with reference to the main drive shaft 6 that the blade 7a admits scene light to the aperture 9 while the shaft 6 is at a standstill, i.e., while the pallet 12a of the blocking lever 12 extends into the notch 11a. The shutter blade 7a thus admits scene light to a film frame behind the aperture 9 as long as the shaft 6 continues to dwell in the preselected angular position, i.e., as long as the motor 2 is at a standstill between two successive exposures. The length of intervals between successive exposures is determined by the resistors of the delay unit 50 which then replaces the resistors 36 and 26b, 26c, and particularly by the receiver 50a which is exposed to scene light. The next exposure begins shortly after the positive potential at the base of the transistor 31 suffices to cause the electromagnet 14 to withdraw the pallet 12a from the notch 11a so that the motor 2 can drive the shaft 6 and the shutter 7 whereby the blade 7a overlies the aperture 9 until after the shaft 6 completes a full revolution to again assume that position in which the pallet 12a extends into the notch 11a and in which the blade 7a allows the film frame behind the aperture 9 to receive scene light. When the transistor 31 begins to conduct and the transistor 38 blocks, the potential at the base of the transistor 39 rises above the threshold value so that the transistor 39 conducts and energizes the electromagnet 14 which pivots the blocking lever 12 to the unblocking position with the just described result, i.e., the shaft 6 is free to rotate so as to complete one revolution in order to advance the film 10 by the length of a frame and to return the blade 7a to the angular position in which the foremost unexposed film frame is exposed to scene light for an interval which is determined by the delay unit 50. As mentioned above, the making of "long" exposures (when the contact 37b engages the contact 37d) takes place while the diaphragm furnishes an aperture of predetermined size which preferably remains unchanged.

The resetting of the camera for normal operation with "short" exposures is effected by moving the contact 37b back to the position shown in FIG. 2 in which the contact 37b engages the contact 37c. The delay unit 50 is then disconnected and the contact 26b can be moved to a desired position, depending upon whether the user wishes to make single exposures, several exposures at predetermined intervals or a series of exposures at variable intervals (as determined by the angular position of the contact 26b with reference to the contact 26c). Such change in angular position of the contact 37b can be brought about by hand or in automatic response to such adjustment of the shutter blade 7a that the latter overlies the aperture 9 when the pallet 12a extends into the notch 11a. At the same time, the diaphragm is again connected with the exposure control in such a way that the latter can change the aperture size as a function of scene brightness. The camera is then ready to make one or more "short" exposures in response to depression of the release knob 17. It will be seen that the exposure time is constant but that the aperture size changes as a function of scene brightness when the camera is set to make one or more "short" exposures, and that the aperture size is constant while the exposure time changes as a function of scene brightness when the camera is set to make one or more "long" exposures.

An important advantage of the improved motion picture camera is that its control circuit 25 can employ a relatively small number of transistors with a low or medium amplification factor. This contributes to overall simplicity, compactness and low cost of the control circuit and reduces the energy requirements of the control circuit. Low energy requirements are particularly important in relatively small portable motion picture cameras which cannot accommodate high-capacity energy sources. Furthermore, the improved control circuit enhances the versatility of the camera, especially as concerns the making of single exposures or the making of exposures at variable intervals, because each single exposure or each time lapse exposure can be made with a relatively short or with a relatively long exposure time.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising a rotary shutter; drive means operable to rotate said shutter in such a manner that the rotation of said shutter through a predetermined angle normally required for the making of an exposure takes up a first predetermined interval of time; blocking means movable between blocking and unblocking positions to thereby respectively prevent and initiate the operation of said drive means; electromagnet means energizable to effect the movement of said blocking means to said unblocking position; selector means having a selector element movable between a first position in which the camera is set for the making of a single exposure and a second position in which the camera is set for the making of a plurality of exposures; release means actuatable to initiate the energization of said electromagnet means; a source of D.C. voltage; and electronic timer means for deenergizing said electromagnet means following second predetermined intervals of time each shorter than said first predetermined interval, said electronic timer means including capacitor means connected to said source of voltage in such a manner that the polarity of voltage thereon is changed from a first to a second polarity following actuation of said release means.

2. A combination as defined in claim 1, wherein said timer means further comprises cascade-connected galvanically coupled first, second and third transistors, connected to said release means in such a manner that said first and third transistors are conductive in response to actuation of said release means and connected to said electromagnet means in such a manner that said electromagnet means is energized when said third transistor is conductive.

3. A combination as defined in claim 2, wherein said timer means further comprises charging resistor means connected to said capacitor means for controlling the charging of said capacitor means in said second polarity; wherein said third transistor is connected to said second transistor in such a manner that said third transistor is blocked when said second transistor is conductive; and wherein said timer means further comprises first connecting means connecting said capacitor means to said second transistor in such a manner that said second transistor conducts when the second polarity voltage across said capacitor means is a predetermined voltage, thereby blocking said third transistor and de-energizing said electromagnet means.

4. A combination as defined in claim 3, wherein said selector means has a selector element movable between said first position, a second position in which the timer is set for the making of time-lapse exposures at selected intervals, and a third position in which the camera is set to make a series of exposures at predetermined intervals.

5. A combination as defined in claim 4, wherein said selector means comprise at least one variable resistor means connected to said capacitor means when said selector element is in said second position, and further comprising means connecting said capacitor means to said source of voltage in such a manner that said capacitor charges in the direction of said first polarity through said variable resistor means when said blocking means is in said blocking position; further comprising means connecting said capacitor means to said first transistor in such a manner that said first transistor changes from a non-conductive to a conductive state when the voltage of said first polarity across said capacitor means is a predetermined voltage, whereby said electromagnet means is re-energized following a delay determined by said variable resistor means when said selector element is in said second position.

6. A combination as defined in claim 4, further comprising second resistor means connected between said source of D.C. voltage and the base of said first transistor when said selector element is in said first position, for maintaining said first transistor in the non-conductive state when said blocking means is in said blocking position.

7. A combination as defined in claim 4, further comprising second resistor means connected between said source of D.C. voltage and said capacitor means when said selector element is in said third position, for maintaining said second polarity voltage across said capacitor means below said predetermined voltage, whereby said second transistor remains in said non-conductive state and said third transistor remains in said conductive state when said selector element is in said third position.

8. A combination as defined in claim 4, wherein said shutter is adjustable to admit scene light in said blocking position of said blocking means; further comprising time delay means connectable with the base of said first transistor to effect a renewed change in the polarity of voltage across said capacitor means and attendant energization of said electromagnet means with a delay determined by said time delay means in such a manner that the film frame which registers with the shutter in the blocking position of said blocking means receives scene light while said blocking means dwells in said blocking position.

9. A combination as defined in claim 8, wherein said time delay means comprises photosensitive receiver means which determines the delay between successive movements of said blocking means from said blocking position as a function of scene brightness.

10. A combination as defined in claim 8 further comprising switchover means actuatable to connect said time delay means with said first transistor substantially simultaneously with adjustment of said shutter to admit scene light in said blocking position of said blocking means.

11. A combination as defined in claim 10, and further comprising diaphragm means adjustable to furnish a plurality of aperture sizes; and means for adjusting said diaphragm means to furnish an aperture of a predetermined size when said shutter is adjusted to admit scene light in said blocking position of said blocking means.

12. A combination as defined in claim 11, wherein said camera has exposure control means for controlling said aperture of said diaphragm means as a function of scene light; and wherein said switchover means switch said diaphragm means from said exposure control means to said means for adjusting said diaphragm means.

13. A combination as defined in claim 12, wherein said means for adjusting said diaphragm means to furnish an aperture of a predetermine size comprise resistor means.

14. A combination as defined in claim 11 further comprising means for actuating said switchover means and for substantially simultaneously adjusting said shutter and said diaphragm means so that said shutter admits scene light in said blocking position of said blocking means and said diaphragm means furnish an aperture of said predetermined size.

15. A combination as defined in claim 14, wherein said means for actuating comprises lever means.

16. A combination as defined in claim 8, further comprising diaphragm means adjustable to furnish a range of aperture sizes, said time delay means comprising photosensitive receiver means which determines said aperture sizes as a function of scene brightness when said time delay means is disconnected from said first transistor and which determines the delays between successive movements of said blocking means from said blocking position as a function of scene brightness when said time delay means is connected with said first transistor.

17. A combination as defined in claim 16, further comprising picture taking objective means and means for directing a portion of scene light which enters by way of said objective means against said photosensitive receiver means.

18. A combination as defined in claim 4, further comprising master switch means and a pnp-transistor which is conductive on closing of said master switch means, said pnp-transistor being arranged to apply a positive potential to the base of said first transistor on closing of said master switch means.

19. A combination as defined in claim 16, wherein said release means comprise release switch means for changing said pnp transistor to the non-conductive state in response to closing thereof.

20. In a motion picture camera having drive means, an arrangement for controlling said drive means for carrying out a sequence of individual exposures by alternately energizing and de-energizing said drive means for a first and second predetermined time interval respectively, comprising, in combination, a source of D.C. voltage having a first and second D.C. output terminal; timing capacitor means having a first and second capacitor terminal; first switch means having a first and second state in response to absence and presence of a control signal, respectively, for connecting said first capacitor terminal to said first and second D.C. output terminal when in said first and second state respectively, whereby the polarity of voltage across said timing capacitor means is reversed upon each change of state of said first switch means; first connecting means for connecting said drive means to said first switch means in such a manner that said drive means is energized when said first switch means is in said second state and de-energized when said first switch means is in said first state; resistance means connected to said timing capacitor means for controlling the charging of said timing capacitor means in such a manner that the voltage across said timing capacitor means reaches a first predetermined amplitude in a first polarity in a time interval corresponding to said first time interval following the switching of said switch means from said first to said second state, and a second predetermined amplitude in a second polarity opposite to said first polarity in a time interval corresponding to said second time interval, following switching of said switch means from said second to said first state; and control circuit means connected to said timing capacitor means and said switching means, for furnishing said control signal to said switching means in response to said voltage having said first predetermined amplitude in said first polarity, and blocking said control signal from said switch means in response to said voltage having said second predetermined amplitude in said second polarity.

21. In a motion picture camera, a combination comprising a rotary shutter; drive means operable to rotate said shutter in such a manner that the rotation of said shutter through a predetermined angle which is normally required for the making of an exposure takes up a first predetermined interval of time; blocking means movable between blocking and unblocking positions to thereby respectively prevent and initiate the operation of said drive means; electromagnet means energizable to effect the movement of said blocking means to said unblocking position; selector means having a selector element movable between a first position in which the camera is set for the making of a single exposure and a second position in which the camera is set for multiple exposures; release means actuatable for furnishing a release signal; and electronic timer means responsive to said release signal for energizing said electromagnet means for second predetermined intervals of time each of which is shorter than said first predetermined interval, said electronic timer means having cascade-connected galvanically coupled first, second and third transistors, connected to said release means in such a manner that said first and said third transistors conduct in response to said release signal, and connected to said electromagnet means in such a manner that said electromagnet means is energized when said third transistor is conductive, said electronic timer means further comprising capacitor means connected in such a manner that the polarity of voltage thereon is reversed following actuation of said release means.

* * * * *